Figure 1:
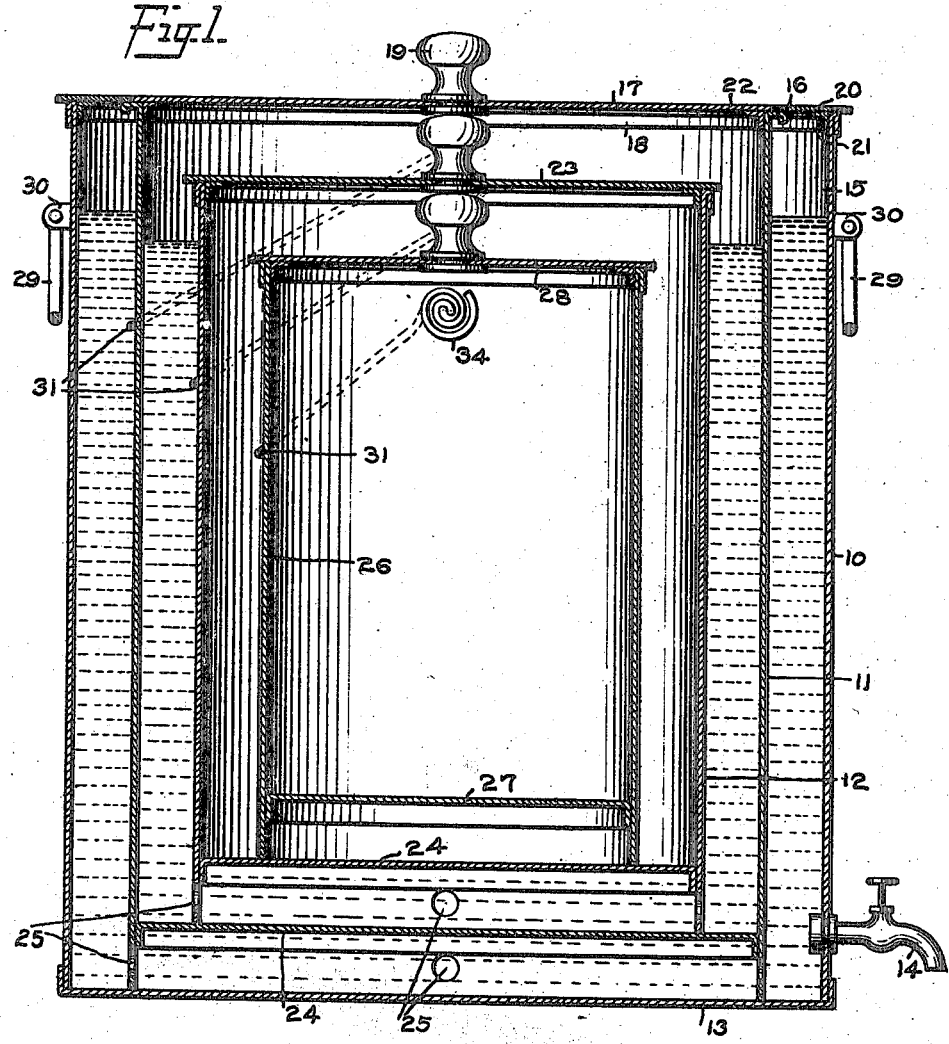

J. CORR.
BREAD SPONGE AND DOUGH RAISER.
APPLICATION FILED MAY 3, 1915.

1,152,299.

Patented Aug. 31, 1915.

WITNESSES
George L. Blume
Geo. L. Beeler

INVENTOR
J. Corr.
BY
ATTORNEYS

UNITED STATES PATENT OFFICE.

JAMES CORR, OF NEW YORK, N. Y.

BREAD SPONGE AND DOUGH RAISER.

1,152,299.   Specification of Letters Patent.   Patented Aug. 31, 1915.

Application filed May 3, 1915. Serial No. 25,514.

*To all whom it may concern:*

Be it known that I, JAMES CORR, a citizen of the United States, and a resident of the city of New York, Jamaica, borough of Queens, in the county of Queens and State of New York, have invented a new and Improved Bread Sponge and Dough Raiser, of which the following is a full, clear, and exact description.

This invention relates to household and culinary appliances and has particular reference to an assemblage of containers adapted in the main to nest within one another and adapted for many and various uses.

Among the objects of the invention is to provide an apparatus useful particularly in rural or other homes which are frequently not thoroughly heated in cold weather, for the purpose of setting and raising bread sponge or dough, a container being arranged to receive the commodity to be treated, and surrounding such container are two or three other containers so proportioned and arranged as to provide a space separating each inner container from the next outer container, thereby insuring sufficient warmth for a long period of time and without danger of overheating at any time, the arrangement furthermore providing for the use of hot water as a source of heat.

A further object of the invention is to provide a plurality of nested containers with peculiar lid formation providing that an innermost container may be inspected or removed by the removal of a disk-like cover but leaving the annular space surrounding the same with its own separate cover undisturbed.

A still further object of the invention is to simplify and improve the means for connecting a bail to a receptacle.

The foregoing and other objects of the invention will hereinafter be more fully described and claimed and illustrated in the drawings forming a part of this specification in which like characters of reference indicate corresponding parts in both the views, and in which—

Figure 2:
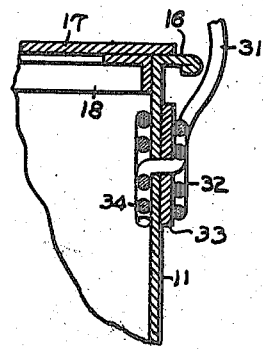

Figure 1 is a vertical sectional view showing a preferred embodiment of my invention complete; and Fig. 2 is a vertical sectional detail indicating the manner of securing a bail to one of the receptacles and showing in larger view the peculiar lid construction above referred to, the plane of this section being at right angles to that of Fig. 1.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings, I show an assemblage of at least three receptacles indicated at 10, 11 and 12. These receptacles are in the main of the same general shape but of different diameters, a receptacle of a smaller diameter fitting sufficiently loosely within a receptacle of the next larger diameter to provide an appreciable space between the walls thereof. Any suitable design or shape in cross section may be adopted in the construction of these receptacles, but I indicate them as of cylindrical form for convenience and as an indication of a suitable form. The receptacle 10 has a permanently connected tight bottom 13 and may be fitted with a suitable drainage faucet 14 for convenience of emptying water therefrom.

The receptacle 11, while of smaller diameter providing a space 15 between it and the wall of the receptacle 10, yet is preferably of the same height as the outer receptacle. The upper end of the receptacle 11 may be bent or turned into a horizontal plane with respect to the main wall of the receptacle, forming a flange 16 extending either outwardly or otherwise and with its upper surface lying substantially in the plane of the upper edge of the receptacle 10. While the material, as intimated above, may vary according to different conditions, I prefer to construct the devices of sheet metal, and hence the flange 16 may be of the same thickness as the main part of the receptacle 11.

At 17 I show a flat disk-like lid having a rim 18 secured on its lower face and fitted within the flange 16 of the receptacle 11. The rim is spaced inwardly from the extreme periphery of the disk 17. In other words, the projecting portion of the disk or lid 17 rests directly upon the inner half of the flange 16. The rim 18 furthermore prevents lateral movement of the lid. A suitable handle indicated by a knob 19 may be connected to the lid 17 for manipulating it.

The annular space 15 between the receptacles 10 and 11 is adapted to be closed by an annular lid 20 having its inner and outer edges resting upon the flange 16 and the upper edge of the receptacle 10 respectively. This lid 20 may have a rim 21 secured to its lower surface of a nature similar to the rim 18 for coöperation with the inner wall of the outermost receptacle. This rim 21 strengthens and stiffens the lid 20 and coöperates with the lid 17 to maintain the annular lid in steady position.

For the purpose of treating bread sponge and bread dough for domestic use in private families especially, the space or a considerable portion of the space 15 is adapted to be filled with warm or hot water, and it is desirable that the receptacle 11 be maintained substantially central with respect to the outermost receptacle so as to insure a space of uniform width around the device to secure the best results. Since, therefore, the two lid portions 17 and 20 are constructed concentrically of each other with the disk lid fitted within the annular lid, they constitute a means to insure that the two receptacles 10 and 11 will be placed concentrically.

The receptacle 12 is preferably as much smaller in diameter than the receptacle 11 as the receptacle 11 is smaller than the largest. Hence, a space 22 is designed to be left between the receptacles 11 and 12 for the circulation of air. This receptacle 12, however, is sufficiently larger than the others surrounding it to provide a continuous air space across the top or lid 23 thereof. Each of the receptacles 11 and 12 has its bottom 24 spaced upwardly from the extreme lower edge of the wall structure to provide a space between it and the next element below it of about the same width or thickness as the lateral space and any suitable number or size of holes 25 may be formed through the lower end of the side wall of each of these receptacles to insure free circulation of air or water, as the case may be, beneath each of these bottoms. In other words, with the space 15 filled with water, the bottom space between the bottom 13 and 24 will likewise be filled with water, and with the space 22 left as an air space between the receptacles 11 and 12, a corresponding air space will be left between the two bottoms 24. The commodity being treated, therefore, may be placed directly in the receptacle 12 without danger of it being overheated because of the insulation resulting from the air space surrounding the receptacle 12 but with sufficient heat maintained for a long period of time from the hot water in the space 15 for the purpose of the device, such warmth being maintained by the fact that the lid 20 need never be removed except for filling or renewing the space 15 with warm water. In other words, the lid 17 may be removed in order to introduce the receptacle 12 into its place or for inspection or treatment of the commodity therein.

While I show in the drawings a fourth receptacle 26, substantially similar in form and design to the receptacle 12 within which it is spaced as the receptacle 12 is spaced from the receptacle 11, I do not rely upon its use for all purposes, especially for bread sponge and dough setting and raising. The bottom 27 of the innermost receptacle, while being elevated as above described above the lower edge of the side wall, it is not intended to provide free circulation beneath it as in other cases. I show a lid 28 for the innermost receptacle having a relation thereto similar to that of the receptacle 12. This innermost receptacle 26 is useful especially in maintaining articles of food or the like warm for the longest period of time by utilizing both the spaces 15 and 22 as hot water compartments. Similarly any of the innermost receptacles may serve as a means for retaining articles of food cool when desired by the application of cold water or ice in the outer spaces.

The outermost receptacle may have pivoted handles 29 secured to ears 30 whereby the same may be manipulated conveniently but without obstructing the space surrounding the same, but each of the inner receptacles is preferably provided with a pivoted bail 31, peculiarly formed from a single heavy wire or rod, the same being bent into a flat spiral or coil 32 lying flatly against the outer face of a disk or reinforcement 33 secured to the outer wall of the receptacle, the wire or rod passing thence inwardly through a hole in the disk or wall where another coil or spiral is formed and lying against the inner wall of the receptacle. This provides a very simple, cheap and reliable bail connection, allowing free swinging movement of the bail but preventing displacement or disconnection thereof from the receptacle.

I claim:

1. In a device of the character set forth, the combination of an outermost receptacle having a tight bottom, a plurality of inner receptacles, each inner receptacle being spaced from the next outer receptacle and having an elevated bottom with a space beneath for communication with the surrounding space between such receptacle and the next outer receptacle, and a lid for each receptacle, the lids for the largest two receptacles fitting to their receptacles in the same plane and each lid being removable independently of the other lid.

2. In a device of the character set forth, the combination of two receptacles, one within the other and having their upper edges lying substantially in the same plane, the upper edge of the inner receptacle being bent laterally into a horizontal flange, a lid for the inner receptacle supported upon said flange and extending outwardly over a part only thereof, means to hold this lid from lateral displacement upon its receptacle, and an annular lid for the outer receptacle supported upon the upper edge thereof and upon the outer portion of said flange.

JAMES CORR.

Witnesses:
Geo. L. Beeler,
Philip D. Rollhaus.